United States Patent
Noethlings et al.

(10) Patent No.: US 8,477,875 B2
(45) Date of Patent: Jul. 2, 2013

(54) METHOD AND RECEIVER FOR DEMODULATION

(75) Inventors: Rolf Noethlings, Stuttgart (DE); Gerd Spalink, Stuttgart (DE)

(73) Assignee: Sony Corporation, Tokyo (JP)

( * ) Notice: Subject to any disclaimer, the term of this patent is extended or adjusted under 35 U.S.C. 154(b) by 350 days.

(21) Appl. No.: 12/864,573

(22) PCT Filed: Dec. 23, 2008

(86) PCT No.: PCT/EP2008/011074
§ 371 (c)(1), (2), (4) Date: Jul. 26, 2010

(87) PCT Pub. No.: WO2009/097890
PCT Pub. Date: Aug. 13, 2009

(65) Prior Publication Data
US 2011/0242429 A1    Oct. 6, 2011

(30) Foreign Application Priority Data
Feb. 6, 2008    (EP) .................................... 08002180

(51) Int. Cl.
*H03K 9/00*    (2006.01)
*H04K 3/00*    (2006.01)

(52) U.S. Cl.
USPC ............................................ 375/316; 455/296

(58) Field of Classification Search
USPC .................. 375/316; 455/212, 218–223, 296
See application file for complete search history.

(56) References Cited

U.S. PATENT DOCUMENTS

| | | | |
|---|---|---|---|
| 4,430,736 A | 2/1984 | Scholz | |
| 8,050,646 B2 * | 11/2011 | Gozen | ........................... 455/296 |
| 2004/0076242 A1 | 4/2004 | Carter et al. | |

OTHER PUBLICATIONS

Office Action issued Jun. 18, 2012 in Chinese Application No. 200880126398.6 (With English Translation).

* cited by examiner

*Primary Examiner* — Lee Nguyen
(74) *Attorney, Agent, or Firm* — Oblon, Spivak, McClelland, Maier & Neustadt, L.L.P.

(57) ABSTRACT

A method of demodulation includes determining samples of a modulated analogue audio signal; determining at least one distorted sample of the samples depending on the signal quality of the modulated analogue audio signal; and replacing the distorted sample.

32 Claims, 20 Drawing Sheets

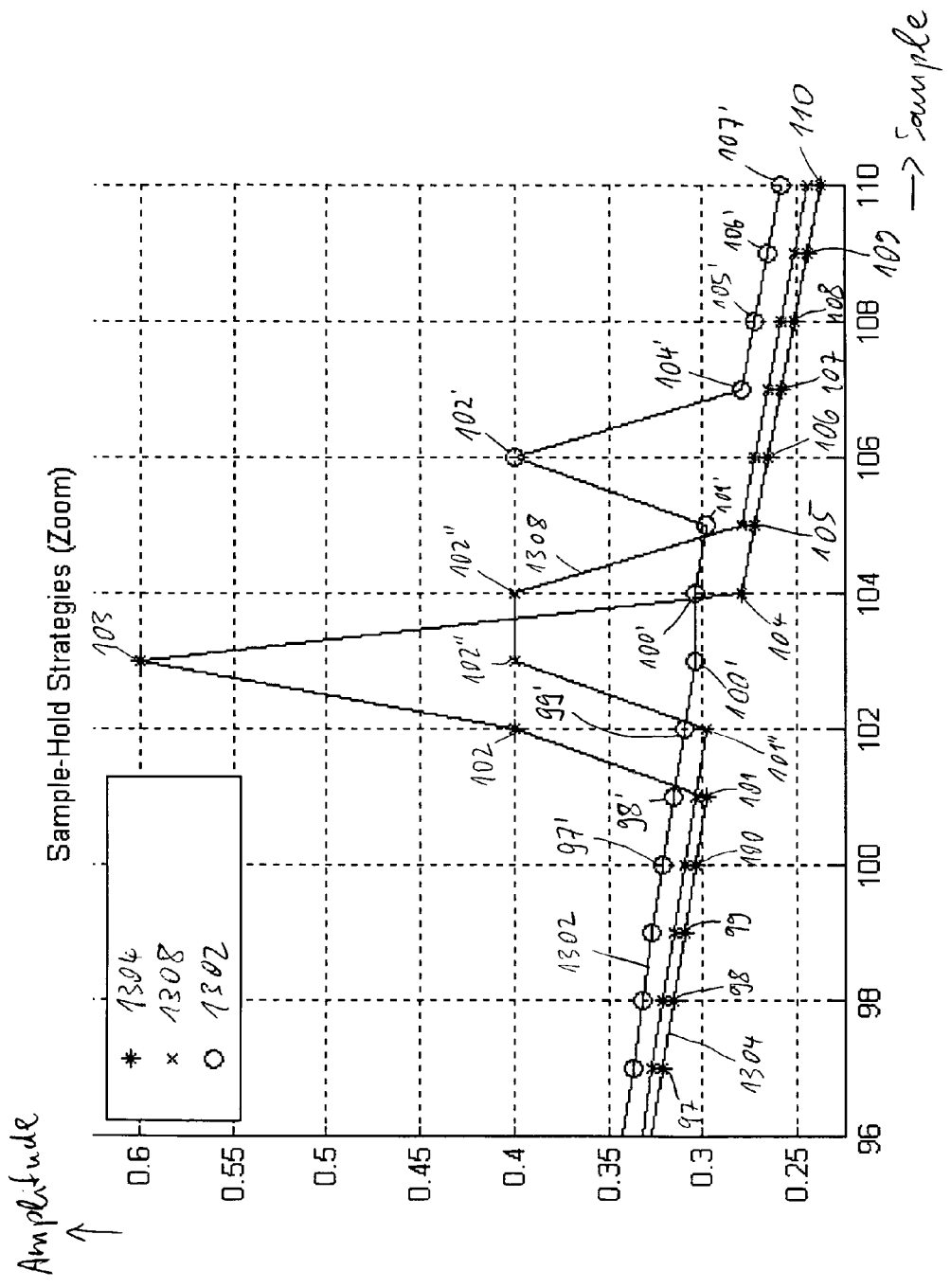

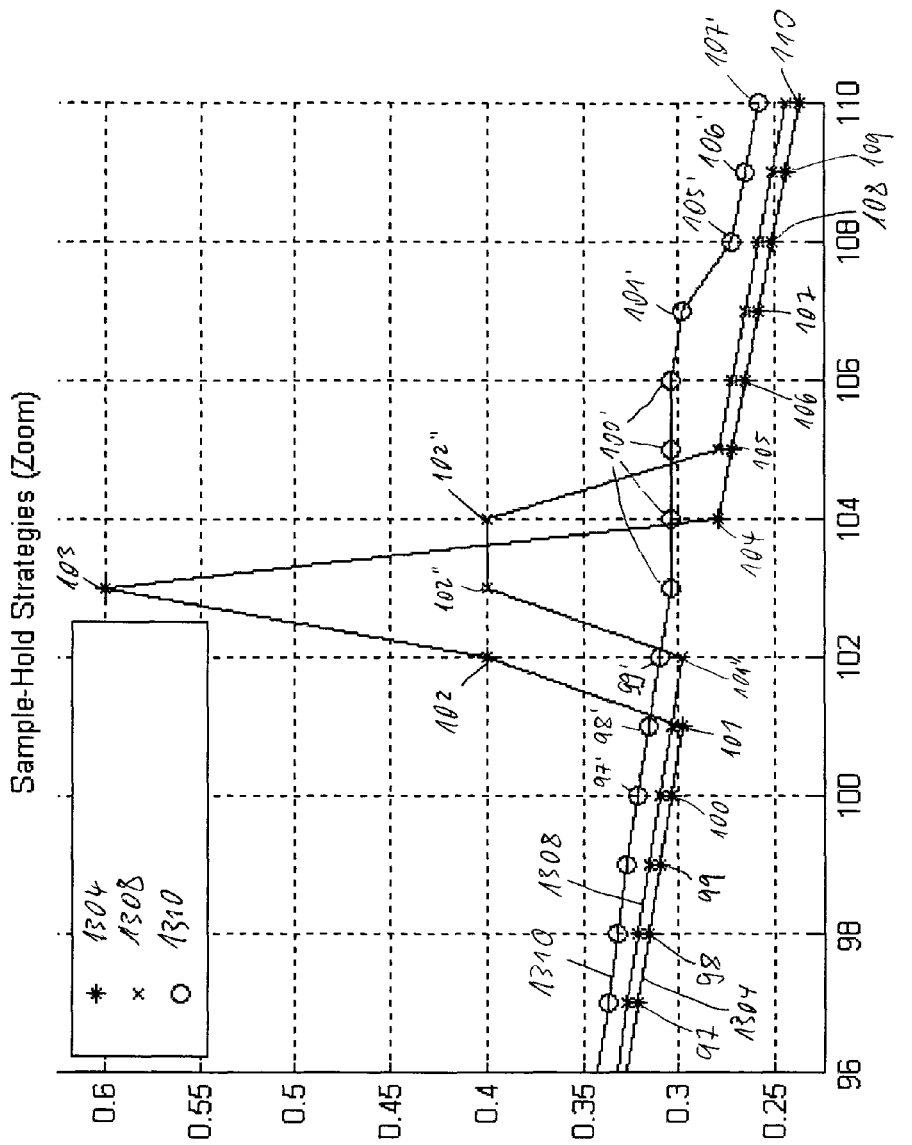

METHOD AND RECEIVER FOR DEMODULATION

An embodiment of the invention relates to a method and a receiver for demodulating an audio signal.

BACKGROUND

Receivers receiving transmitted sound signals need to play back acceptable audio even under very bad reception conditions, which might be low antenna signal levels or e.g. for television receivers, very bad picture-to-sound-ratios. In such cases the audio de-modulator signal level is very weak, and may even be close to zero for short periods of time.

It is an object of the invention to provide a method and receiver for demodulation that improves an output (demodulated) audio signal even under such bad reception conditions.

This object is solved by a method and receiver according to claims 1, 11, and 20.

Further details of the invention will become apparent from a consideration of the drawings and ensuing description.

DETAILED DESCRIPTION

In the following, embodiments of the invention are described. It is important to note that all embodiments described in the following may be combined in any way, i.e. there is no limitation that certain described embodiments may not be combined with others. Further, it should be noted that same reference signs throughout the Figures denote same or similar elements.

Figure 1:
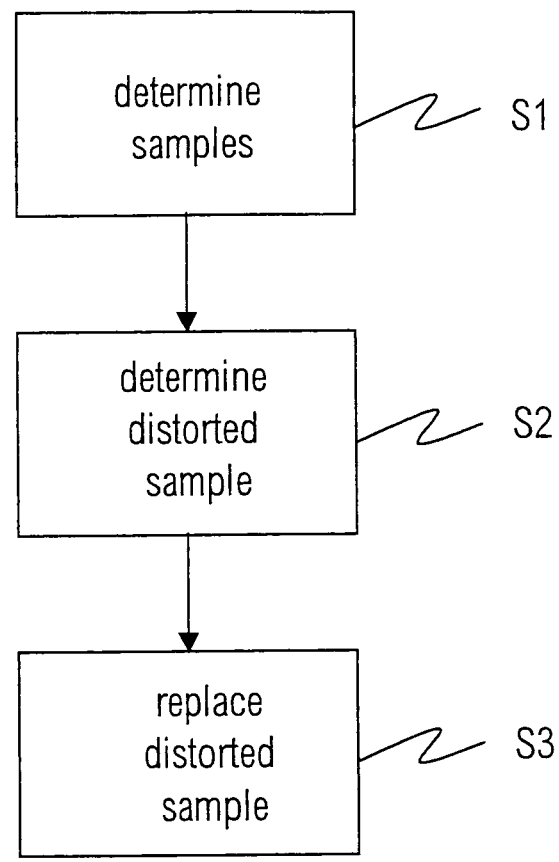
FIG. 1 shows a method for demodulation according to an embodiment of the invention.

FIG. 1 shows a method for demodulation according to an embodiment of the invention. In a first step S1, samples of a modulated analog audio signal are determined. The samples are e.g. determined based on a demodulation of the modulated analog audio signal. The "samples" are, thus, demodulated samples.

The modulated analog audio signal, may e.g. be a frequency modulated analog audio signal, phase modulated analog audio signal or amplitude modulated audio signal. The audio signal might be received via an antenna or via cable. Further the audio signal might be part of a television signal.

In a following step S2, a distorted sample is determined depending on a signal quality of the modulated analog audio signal. For example, if the signal quality of the modulated analog audio signal is below a predefined threshold (signal quality threshold), then a corresponding sample might be determined to be a distorted sample.

In step S3, the distorted sample is replaced, concealed, canceled, deleted and/or otherwise processed.

Figure 2:
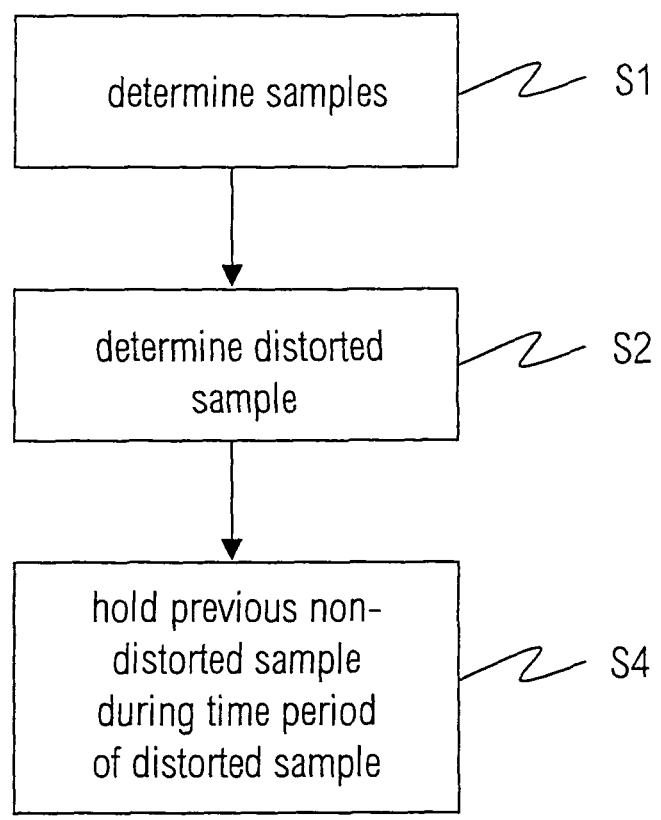
FIG. 2 shows a further embodiment of a method for demodulation.

FIG. 2 shows a further embodiment of the invention according to which a distorted sample is replaced with a previous non-distorted sample. In the embodiment of FIG. 2, steps S1 and S2 correspond to steps S1 and S2 of FIG. 1. For replacing a distorted sample with a previous non-distorted sample, a previous non-distorted sample is held during the time period of the distorted sample.

In a further embodiment of the invention (not shown in FIG. 2) it is also possible to replace a distorted sample with a following non-distorted sample. In this case the audio output may be delayed.

Figure 3:
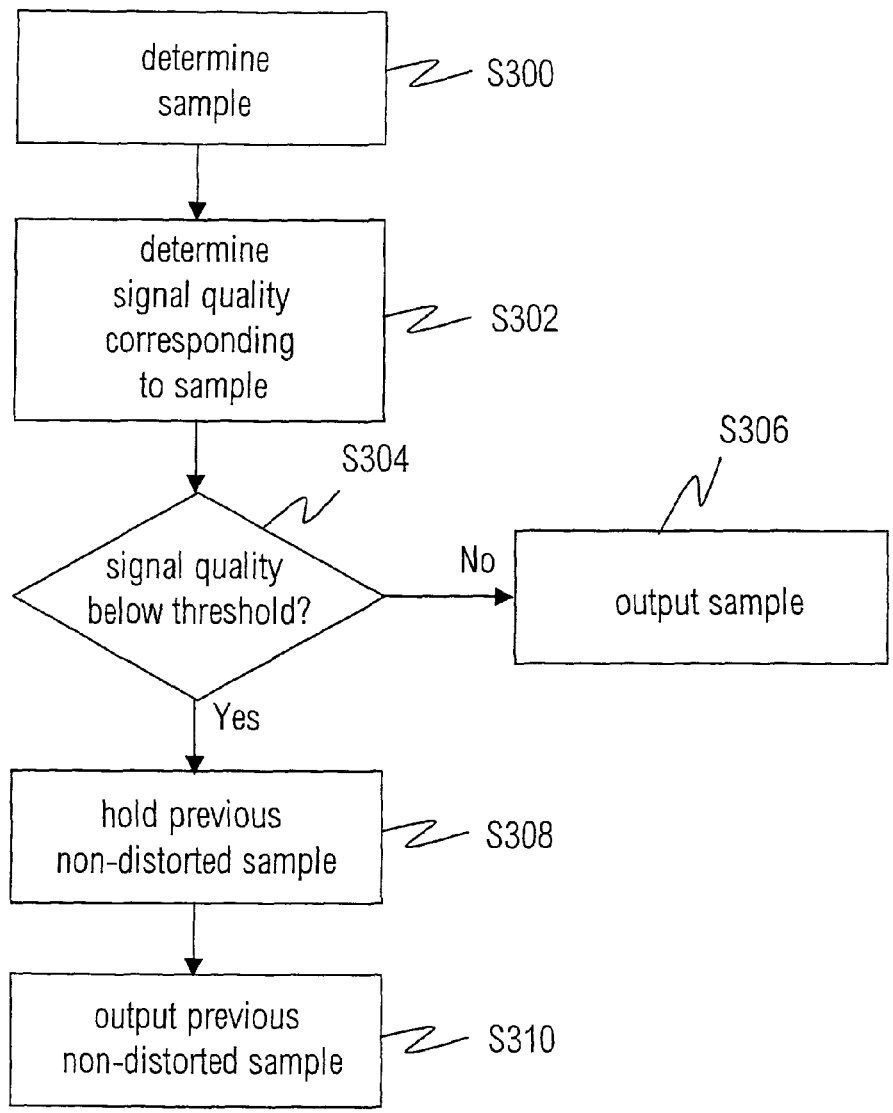
FIG. 3 shows still a further embodiment of the method for demodulation.

FIG. 3 shows a further embodiment of the invention, wherein a distorted sample is replaced by a previous non-distorted sample, and the distorted sample is judged to be a distorted sample if a corresponding signal quality is below a threshold (signal quality threshold).

Thus, in step S300, a sample of the modulated analog audio signal is determined, and in step S302, a signal quality of the modulated analog audio signal corresponding to the sample determined in step S300, is determined.

In step S304, it is evaluated whether the signal quality determined in step S302 is below a threshold (signal quality threshold). If the signal quality is not below the threshold, i.e. the signal quality of the sample is good, the sample is output in step S306 for further processing. On the other hand, if in step S304, the signal quality is below the threshold, in step S308, a previous non-distorted sample is held during the time period of the distorted sample. Consequently, the distorted sample is concealed, i.e. replaced with a previous non-distorted sample.

In step S310, the previous non-distorted sample which is held during the time period of the distorted sample, is output.

In a further embodiment of the invention (not shown in figures), if the signal quality corresponding to the previous non-distorted sample is higher than for the following non-distorted sample, the previous non-distorted sample is used for displacing the distorted sample, and, if the signal quality corresponding to the following non-distorted sample is higher than for the previous non-distorted sample, the following non-distorted sample is used for replacing the distorted sample. In other words, a distorted sample may be replaced by a surrounding, i.e. previous or following, non-distorted sample, wherein the surrounding sample is used having the best signal quality.

In a further embodiment of the invention, at least one replacement sample may be generated based on an interpolation, e.g. a linear interpolation, of a previous and following non-distorted sample, wherein the distorted sample is replaced by the replacement sample. The interpolation may depend on the signal quality. Since the signal quality may be regarded as a continuous measure, the samples may be weighted when determining the interpolation.

Figure 4:
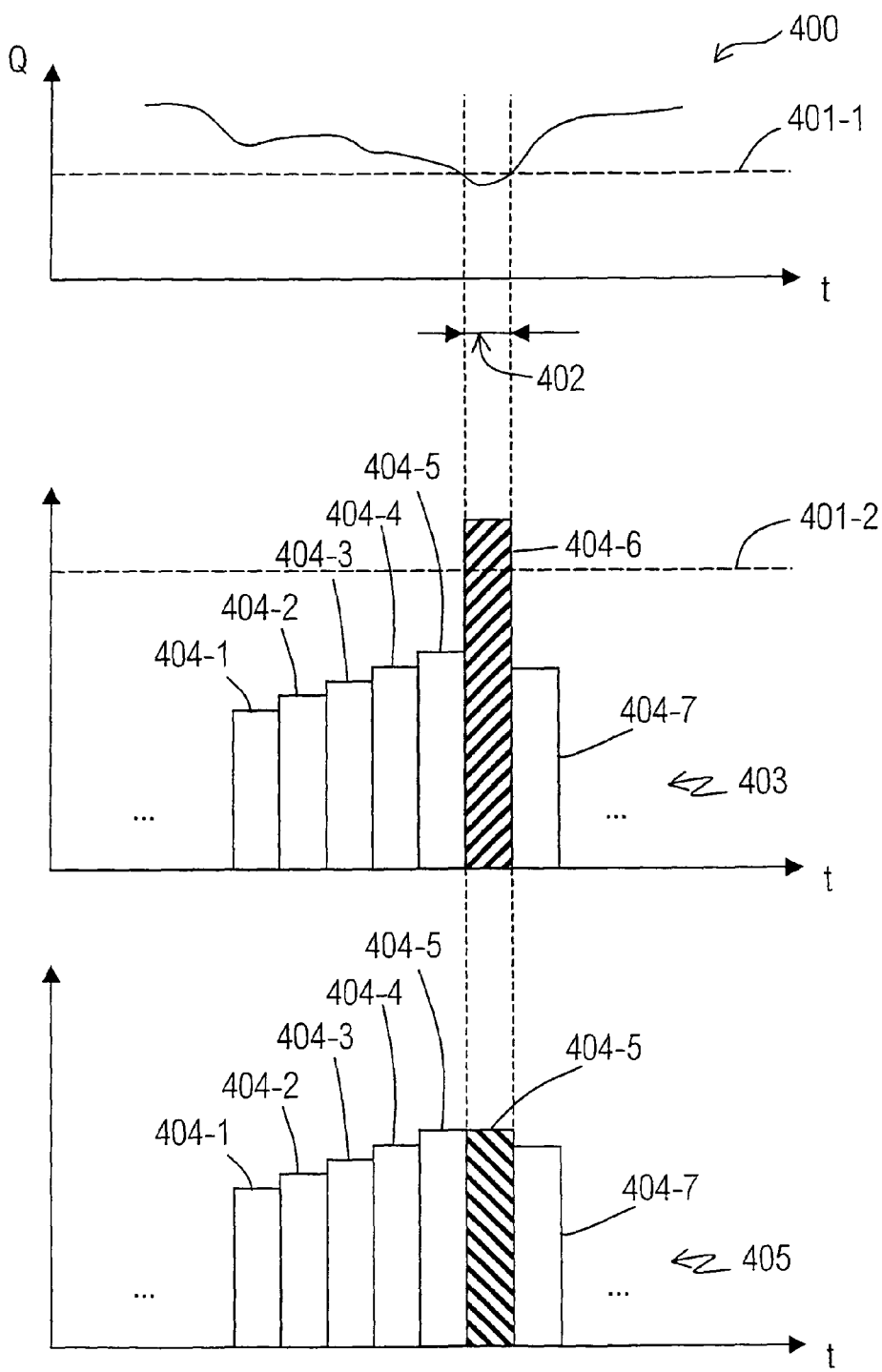
FIG. 4 shows diagrams illustrating aspects of an embodiment of the invention.

FIG. 4 shows a diagram 400 depicting a signal quality Q of a modulated analog audio signal. The diagram 400 also depicts a threshold 401-1 (signal quality threshold). As can be seen, in the example of FIG. 4, the signal quality Q lies above threshold 401-1 except during a time period 402.

Diagram 403 of FIG. 4 shows samples 404-1, ..., 404-7 that have been determined by demodulating the modulated analog audio signal. Among samples 404-1, ..., 404-7, sample 404-6 is a distorted sample which is determined by evaluating the signal quality Q as explained at hand of diagram 400. Since the signal quality Q is below signal quality threshold 401-1 during time period 402, sample 404-6 corresponding to time period 402 is determined/judged to be a distorted sample.

In one embodiment, it is already enough to use signal quality Q in combination with signal quality threshold 401-1 in order to determine that a sample is a distorted sample.

In another embodiment, however, a further threshold 401-2 (in the following also referred to as sample threshold) may be taken into account, in addition or alternatively to the signal quality threshold 401-1.

As can be seen, sample 404-6 lies above sample threshold 401-2. Therefore, since sample 404-6 lies above sample threshold 401-2 and the signal quality Q lies below the signal quality threshold 401-1 for sample 404-6, sample 404-6 is determined to be a distorted sample. Thus, for sample 404-6 that is judged to be a distorted sample two conditions are fulfilled: first, the signal quality Q lies below signal quality threshold 401-1 and, second, the value of sample 404-6 lies above sample threshold 401-2.

The sample threshold 401-2 might be determined depending on standards, receiver design, internal dynamic range of the receiver, internal head room, and other receiver parameters as defined for a modulated analog audio signal that is to be demodulated. For example, sample threshold 401-2 might correspond to 20% of the maximum possible sample value.

Diagram 405 shows samples 404-1, ..., 404-5 and sample 404-7. However, sample 404-6 of diagram 403 is not shown. Sample 404-6 has been replaced by sample 404-5.

If the modulated analog audio signal is a frequency modulated analog audio signal, the signal quality may be determined based on the magnitude of the modulated analog audio signal. Thus, in case of a frequency modulated analog audio signal, a distorted sample may be determined if the magnitude of the frequency modulated analog audio signal is below a predefined threshold.

Figure 5:
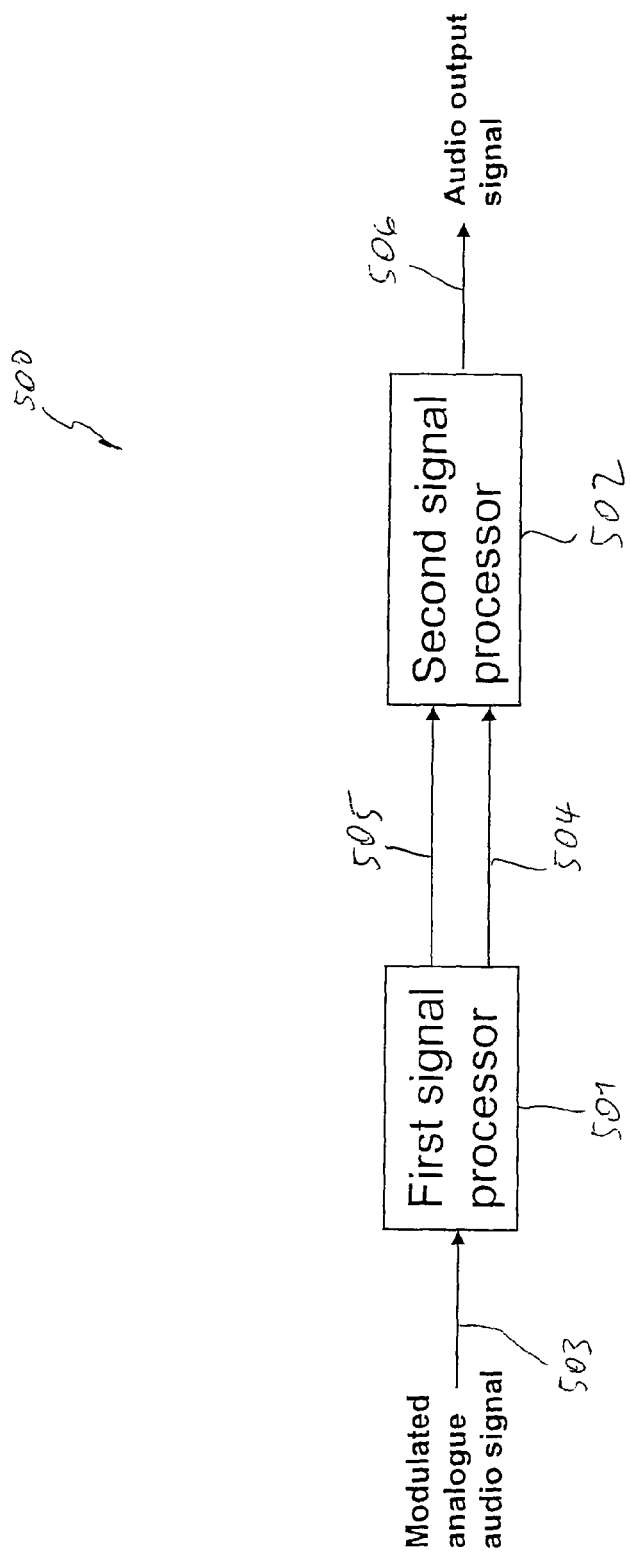
FIG. 5 shows a receiver according to a further embodiment of the invention.

FIG. 5 shows a receiver 500 according to a further embodiment of the invention comprising a first signal processor 501, and a second signal processor 502. First signal processor 501 may be a demodulator e.g. based on CORDIC (COordinate Rotation DIgital Computer) algorithm/hardware. First signal processor 501 receives a modulated analog audio signal 503 and is adapted to determine samples 504 of the modulated analog audio signal 503. First signal processor 501 is further adapted to determine a signal quality 505 of the modulated analog audio signal.

The "samples" are, thus, demodulated samples.

Second signal processor 502 receives samples 504 and signal quality 505 and is adapted to determine distorted samples depending on signal quality 505. Further, second signal processor 502 is adapted to replace distorted samples and to output the corresponding audio output signal 506, wherein a distortion due to the distorted sample is not noticeable.

In FIG. 5, first signal processor 501 may also be referred to as first signal processing means which may be based and/or comprises a demodulator, CORDIC hardware, or a phase-locked loop PLL. Further, second signal processor 502 may also be referred to as second signal processing means for holding a previous sample during a time period corresponding to a distorted sample. The second signal processing means may consist of or comprise a flip flop with an enable input which is controlled by the signal quality 505 or a logic signal derived from the signal quality.

Figure 6A:
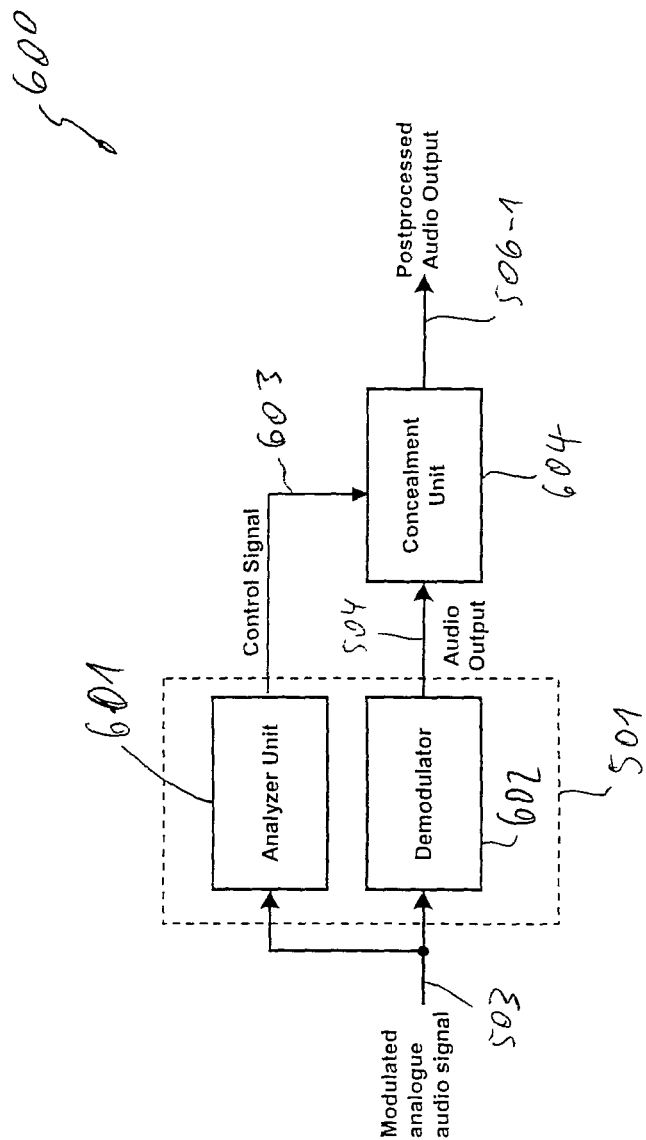
FIG. 6 shows a receiver according to a further embodiment of the invention.

FIG. 6A shows a receiver 600 according to a further embodiment of the invention. In receiver 600, the first signal processor 501 comprises an analyzer unit 601, and a demodulator 602. The analyzer unit 601 determines a control signal 603 and demodulator 602 determines samples 504. In concealment unit 604, the control signal 603 is used for indicating distorted samples. Further, the control signal 603 might be used for controlling a hold unit and/or sample and hold unit for holding a previous non-distorted sample during the time period of a distorted sample. In the embodiment of FIG. 6A, the control signal depends substantially on the signal quality but not on the value of samples 504.

In the audio output signal 506, distorted samples are replaced by non-distorted samples.

Figure 6B:
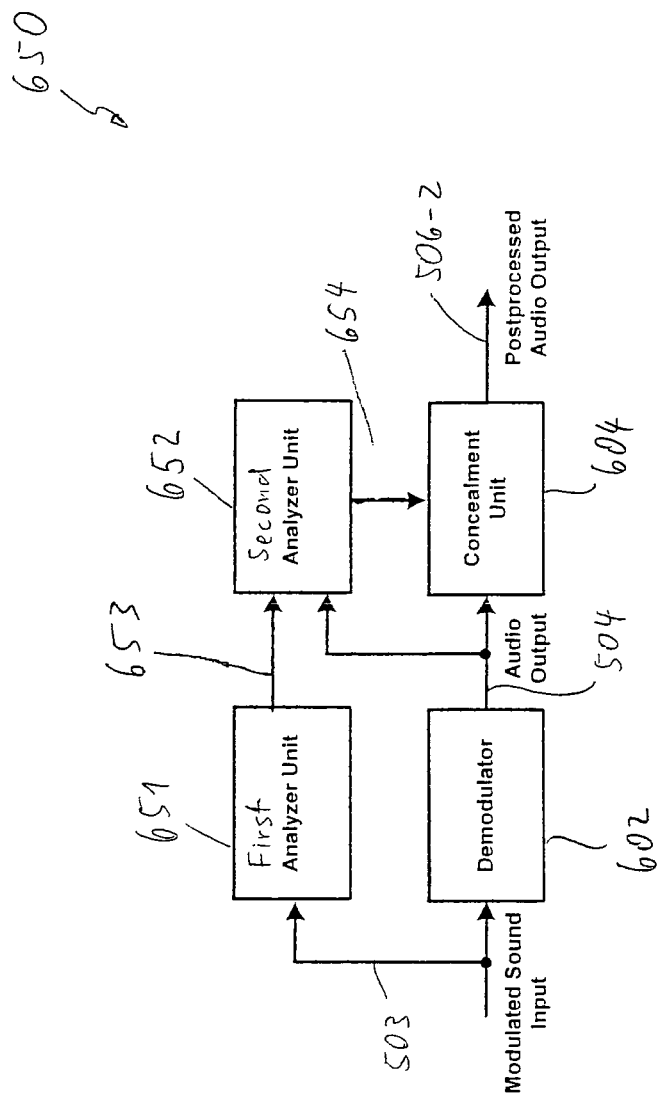

FIG. 6B shows a receiver 650 according to a further embodiment of the invention. Compared to the receiver of FIG. 6A, the receiver 650 of FIG. 6B comprises two analyzer units, i.e. a first analyzer unit 651 and a second analyzer unit 652.

The first analyzer unit 651 has the modulated analog audio signal as an input. Internally, first analyzer unit 651 may determine a signal quality, e.g. the signal quality Q as explained at hand of FIG. 4, and outputs a first control signal 653. The first control signal 653 may be a binary signal, e.g. "ON/OFF" signal, indicating whether the signal quality of signal 503 lies above or below a signal quality threshold, e.g. the signal quality threshold 401-1 of FIG. 4.

First analyzer unit 651 outputs an "ON" value for first control signal 653 if the signal quality of signal 503 lies below a signal quality threshold, e.g. the signal quality threshold 401-1 of FIG. 4. In other words, the first analyzer unit 651 turns on second analyzer unit 652, if the condition is fulfilled.

The second analyzer unit 652 determines a second control signal 654 depending on first control signal 653 and depending on the samples 504. Internally, second analyzer unit 652 may determine if the value of a respective sample of the samples 504 lies above or below a sample threshold, e.g. threshold 401-2 of FIG. 4.

The output of second analyzer unit 652 is a second control signal 654 which may be a binary signal, e.g. an enable signal for a sample and hold unit.

Second analyzer unit 652 outputs an enable signal indicating a value of "disable" if first control signal 653 has an "ON" value and the value of a respective sample of samples 504 lies above the sample threshold. If the enable signal is used for controlling a sample and hold unit, "disable" in this respect means to hold the value.

Concealment unit 604 is controlled by the second control signal 654, i.e. the second control signal 654 is used for indicating distorted samples. Thus, in the embodiment of FIG. 6B, second control signal 654 might be used for controlling a hold unit and/or sample and hold unit for holding a previous non-distorted sample during the time period of a distorted sample. As is clear from the above, in the embodiment of FIG. 6B, second control signal 654 depends on the signal quality of signal 503 and on the value of samples 504.

Figure 7:
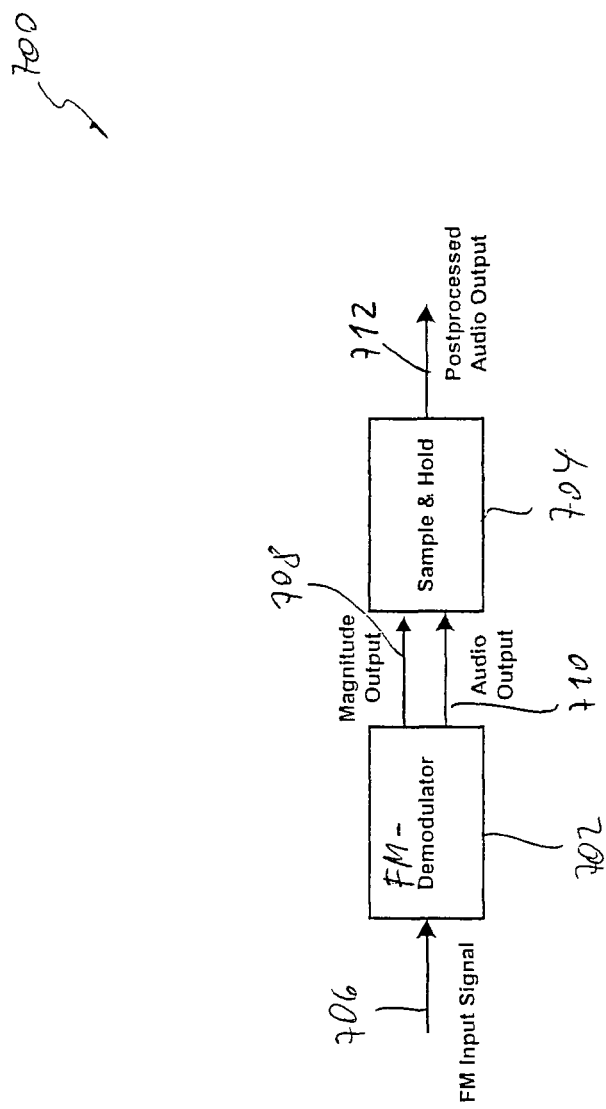
FIG. 7 shows a receiver according to a further embodiment of the invention.

FIG. 7 shows a receiver 700 according to a further embodiment of the invention. Receiver 700 comprises an FM demodulator 702, and a sample and hold unit 704. FM demodulator 702 processes a received FM input signal 706 and outputs corresponding audio samples 710 as well as a magnitude signal 708 corresponding to the magnitude of FM input signal 706. If the magnitude 708 is below a threshold (signal quality threshold), then sample and hold units 704 holds a previous non-distorted sample.

Figure 8:
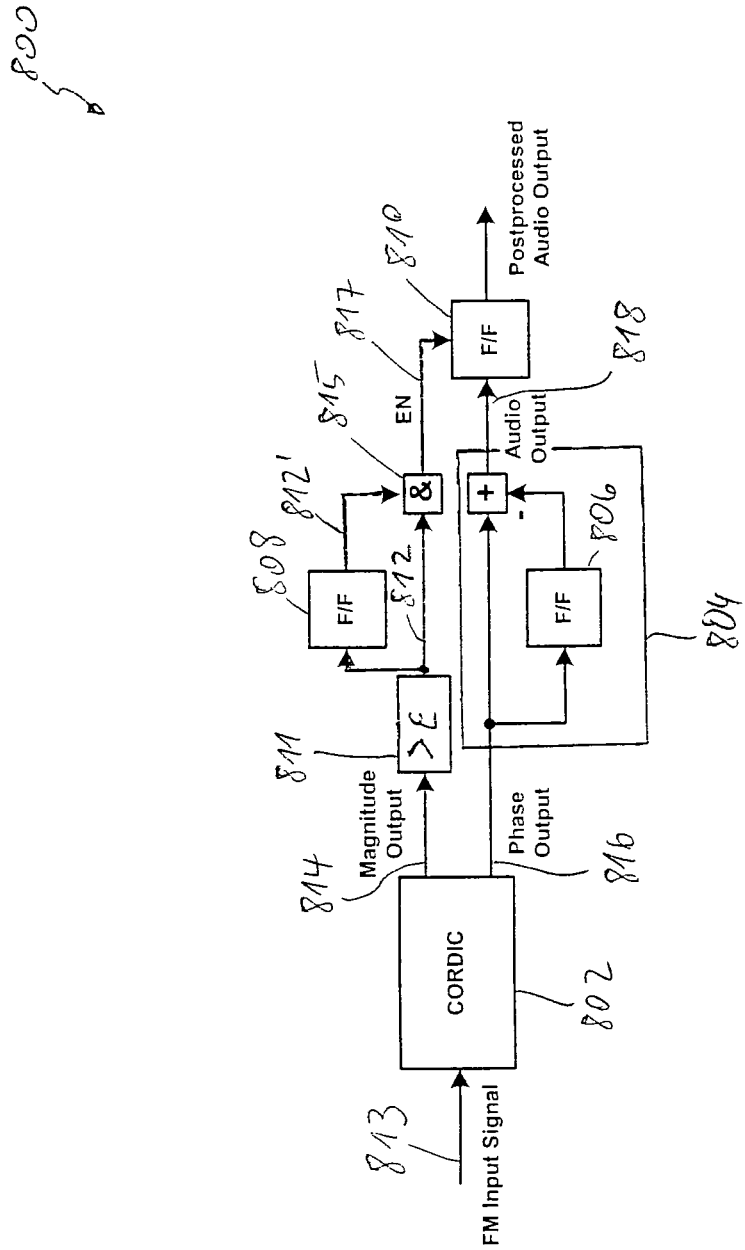
FIG. 8 shows a receiver according to a further embodiment of the invention.

FIG. 8 shows a receiver 800 according to a further embodiment of the invention. Receiver 800 comprises a CORDIC unit 802, a differentiator 804, a first storage 806, a second storage 808, a third storage 810, and a threshold unit 811. First storage 806, second storage 808, and third storage 810 may be realized as flip flop circuits with respective enable signals as input signals.

CORDIC unit 802 processes an FM input signal 813 and determines its magnitude 814 and phase 816. Threshold unit 811 compares the magnitude 814 with a predefined threshold (signal quality threshold) and outputs a binary signal 812 (low or high). In second storage 808, the binary signal 812 is stored for a time period corresponding to the duration of one sample. The binary signal 812 of a current sample and the binary signal 812' of a previous sample which had been stored in second storage 808 are combined in an AND logic unit 815. The output of AND logic unit 815 is an enable signal 817. From the foregoing, it is clear that threshold unit 811, second storage 808, and AND logic unit 815 assure that for one sample having a magnitude below a threshold (signal quality threshold) the enable signal 817 is disabled for this current sample and one following sample.

The enable signal 817 controls third storage 810 to hold a previous sample 818 output by the differentiator 804. In other words, as long as enable signal 817 is disabled a previous sample is held and output.

As is clear from FIG. 8, due to the threshold unit 811, second storage 808, and AND logic unit 815, for a period of N invalid (distorted) input samples $N_{+}1$ audio samples are post-processed, e.g. by holding a previous non-distorted sample. In FIG. 8, threshold unit 811, second storage 808, and AND logic unit 815 may be regarded as enable signal generating means.

Figure 9:
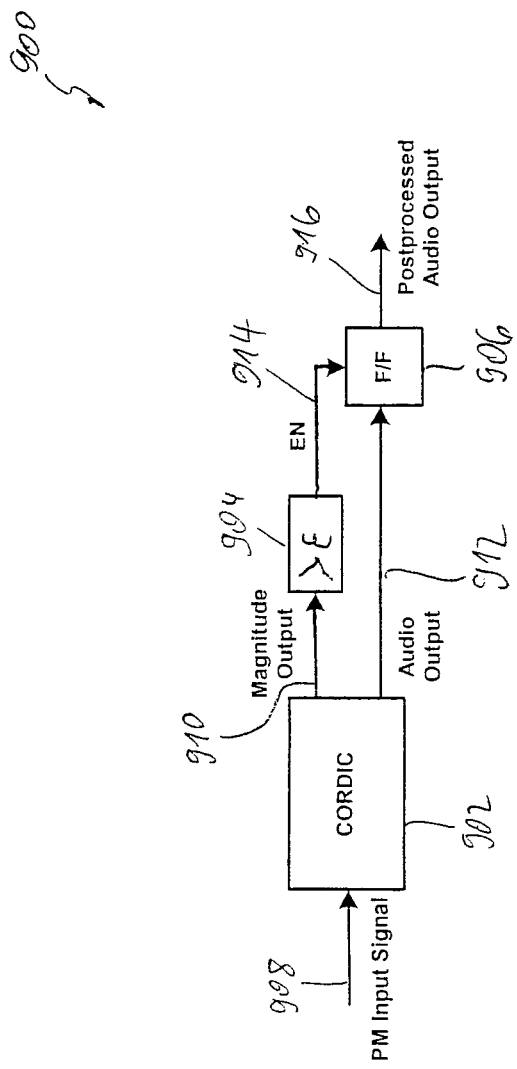
FIG. 9 shows a receiver according to a further embodiment of the invention.

FIG. 9 shows a receiver 900 according to a further embodiment of the invention. Receiver 900 comprises a CORDIC unit 902, threshold unit 904, and storage 906. CORDIC unit 902 receives a phase modulated input signal 908 and outputs the magnitude 910 of phase modulated input signal 908 as well as samples 912. If magnitude 910 of phase modulated input signal 908 is below a predefined threshold (signal quality threshold), threshold unit 904 (=enable signal generating means) disables an enable signal 914. Enable signal 914 is used to control storage 906 holding a sample if said enable signal 914 is disabled. Thus, if magnitude 910 is below a threshold, then a previous sample is output as audio 916 instead of the distorted sample having the corresponding magnitude 910 below a predefined threshold.

It should be noted that throughout the Figures "F/F" stands for flip-flop which might be a realization for a storage according to an embodiment of the invention.

Figure 10:
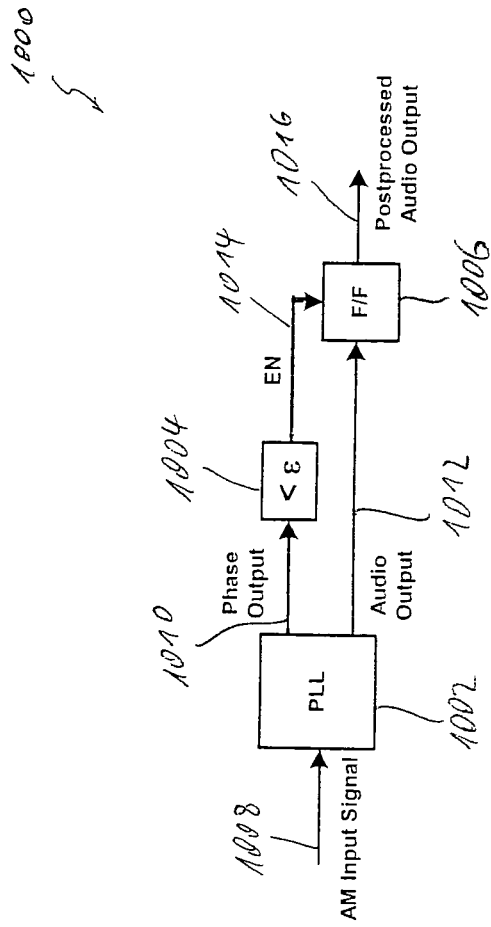
FIG. 10 shows a receiver according to a further embodiment of the invention.

FIG. 10 shows a receiver 1000 according to a further embodiment of the invention. Receiver 1000 comprises a phase-locked loop PLL 1002, a threshold unit 1004, and a storage 1006. Phase-locked loop 1002 processes an AM input signal 1008 and outputs the phase 1010 of AM input signal 1008 and corresponding audio samples 1012. PLL 1002, thus, realizes a coherent demodulation. If phase 1010 is greater than a predefined threshold (signal quality threshold), then threshold unit 1004 (=enable signal generating means) disables an enable signal 1014 which is a binary signal. Enable signal 1014 is used to control storage 1006, e.g. realized as a flip-flop with enable input. Thus, storage 1006 stores the previous sample and thereby replaces a current distorted sample. Thus, audio output 1016 does not comprise distorted samples.

Figure 11:
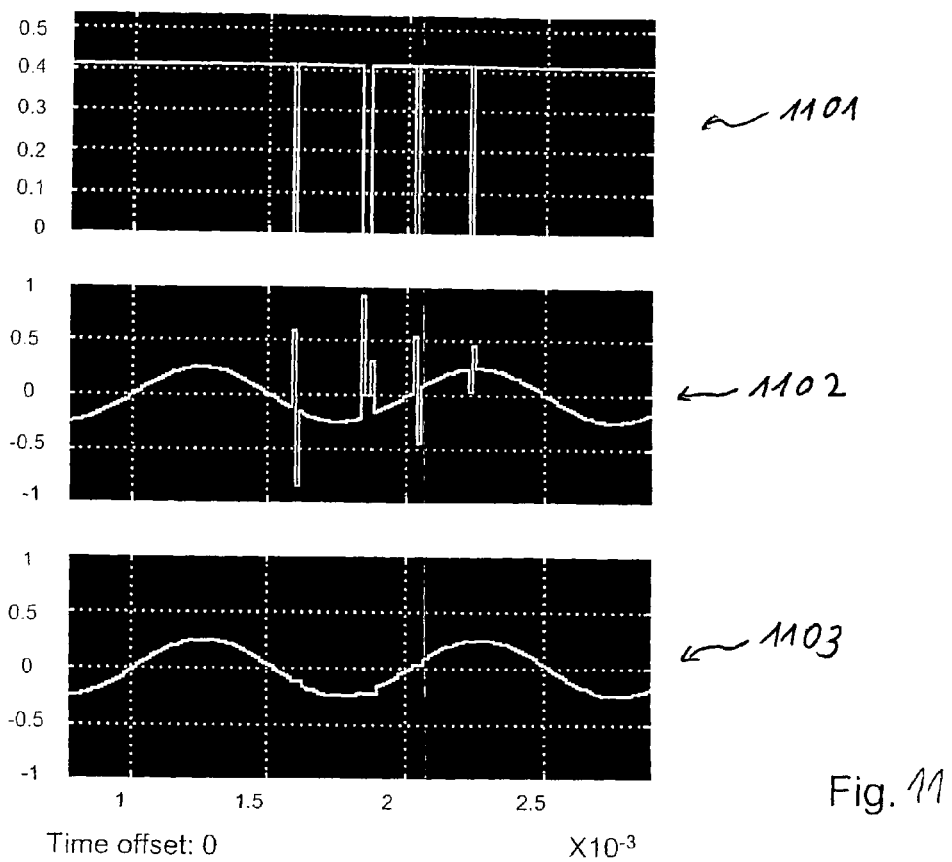
FIG. 11 shows a further diagram for explaining effects of embodiments of the invention.

FIG. 11 shows a first diagram 1101, a second diagram 1102, and a third diagram 1103.

First diagram 1101 shows the magnitude output of an FM demodulator. The dropping amplitude indicates a disappearing (unreliable) input, i.e. a low signal quality of the modulated input signal/antenna signal.

The second diagram 1102 shows a demodulated audio output of an audio demodulator where distorted samples are not replaced. As can be seen, there are big distortions coming from not-determinable phase information.

The third diagram 1103 shows the audio output, wherein a sample and hold logic has been used to hold a previous non-distorted sample in case of an unreliable input, i.e. an input signal where the magnitude is below a predefined threshold (signal quality threshold).

The following elucidations may help to get a better understanding of embodiments of the invention or of the background:

As is clear, especially in phase modulated audio signals, e.g. in FM, which is used in many transmission standards, a zero input leads to strongly discernable click noises. In such a case, no phase may be derivable and "full amplitude random" may be played back. However, broadcast receivers are supposed to play back acceptable audio even under very bad reception conditions, i.e. even in case of very weak input levels, or, in case of television receivers, in case of very bad picture to sound ratios.

For phase modulated signals, e.g. FM, which is used in most of the common television and radio standards, a (partly) disappearing input leads to big distortions. The phase of a complex base band signal sample with zero amplitude cannot be determined and the audio output is random with (maybe) full amplitude for that sample, or even a certain period of time. This may be heard as a click or spike noise.

Such click or spike noises may be avoided as explained above, e.g. by applying a method for demodulation as explained above, or using a receiver as explained above.

Figure 12:
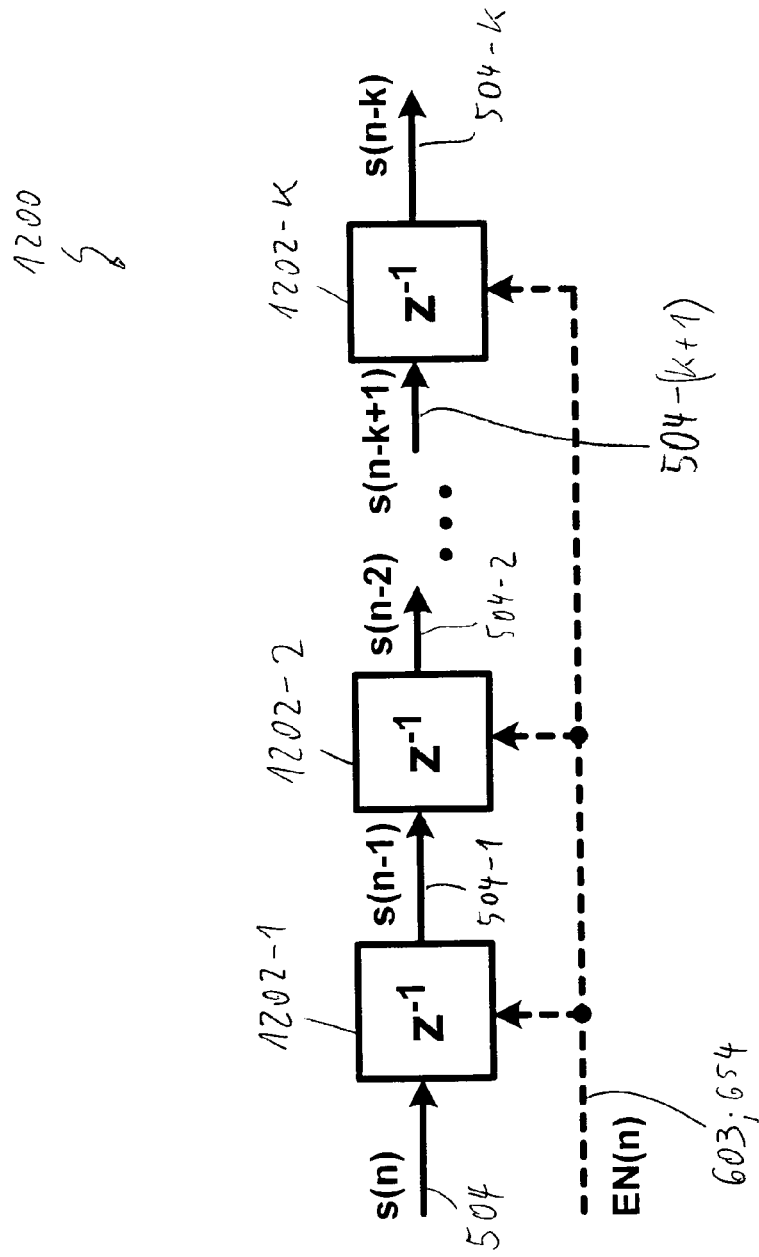
FIG. 12 shows an embodiment of a concealment unit.

FIG. 12 shows a further embodiment of a receiver 1200. Receiver 1200 includes a series of k storage elements 1202-1, ..., 1202-k. The storage elements ($z^{-1}$) can each store one sample s and delay the output by one sample. The storage elements might e.g. be realized as a "flipflop" circuit. The series of storage elements 1202-1, ..., 1202-k is, thus, adapted to receive and store a sequence of samples s(n), s(n-1), s(n-2), ..., s(n-k). Thereby, all storage elements 1202-1, ..., 1202-k are controlled by the same enable Signal EN(n) which depends on the signal quality of the modulated analog audio signal. When the enable signal EN(n) is disabled the respective storage element holds at the output the previous sample and does not store the corresponding sample s(n) at its input.

In one embodiment, the circuit shown in FIG. 12 might be located in the concealment unit 604 shown in FIG. 6A or alternatively in the concealment unit 604 shown in FIG. 6B. Thus, the signal s(n) might correspond to signal 504 of FIGS. 6A and 6B. Also, the enable signal EN(n) might correspond to the signal 603 or 654 shown in FIGS. 6A and 6B.

The functioning of the circuit shown in FIG. 12 should be understandable for those skilled in the art. The functioning will be explained in the following.

As is clear, as long as the enable signal EN(n) is "1", the corresponding sample s(n) is a determined to be a non-distorted sample. In this case, all of the storage elements 1202-1, . . . , 1202-$k$ are respectively outputting a previous sample stored therein and store the respective input sample. For example, storage element 1202-2 outputs sample s(n-2) corresponding to the second previous sample to s(n) and stores therein the previous sample s(n-1). This previous sample s(n-1) which is the sample preceding sample s(n) is output from storage element 1202-1 which in turn stores sample s(n).

So if there are no distortions (enable signal is enabled), then the circuit of FIG. 12 results in a time-shifted output of demodulated samples.

Figure 13A:
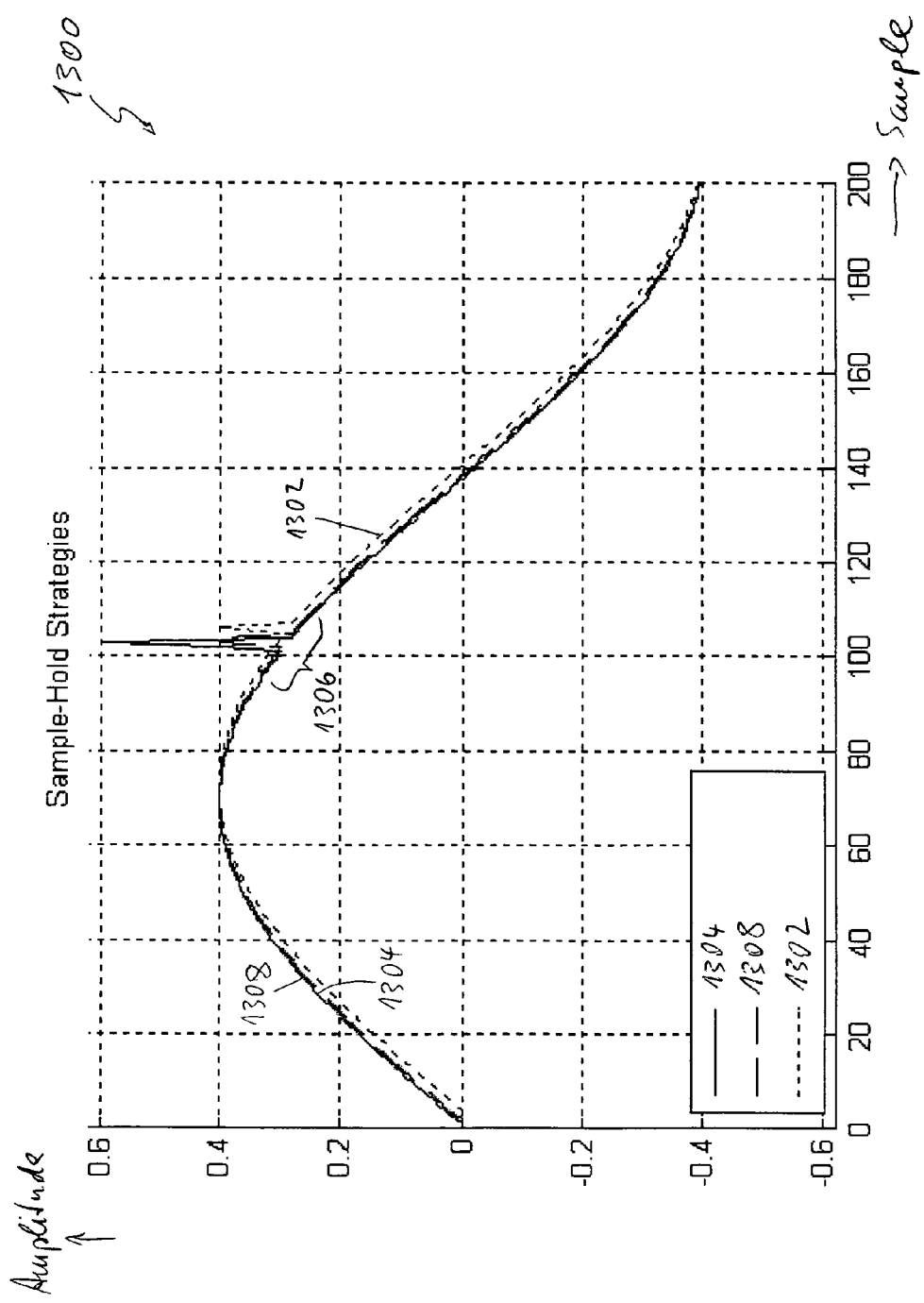
FIG. 13 shows results achieved with the embodiment of FIG. 12.

The time-shift may be seen at hand of FIGS. 13A and 13B. In diagram 1300 of FIG. 13A, the curve with reference sign 1302 depicted with a dashed line corresponds to the output of circuit 1200 in FIG. 12 when a sine signal is used as input signal 1304. For the simulation underlying FIGS. 13A and 13B, three storage elements (delay units) have been used. Thus, in FIG. 12 there would be three storage elements 1202-1, 1202-2 and 1202-3. Therefore, curve 1302 is shifted by three samples (three time units of a sample) with respect to input signal 1304.

If, however, a distorted sample occurs, the enable signal EN(n) will be disabled. In this case, the distorted sample will not be stored in the first storage element 1202-1 and the last "historic" sample s(n-k) will be held (repeated).

As can be seen in diagram 1300 in FIG. 13A, in region 1306, a distortion of input signal 1304 occurs. This part, where the distortion occurs, is depicted in FIG. 13B in an enlarged view.

In FIG. 13B, the input signal 1304 is depicted with asterisks. Further, reference sign 1302 (curve with small circuits) corresponds to the output of circuit 1200 in FIG. 12. For comparison, the output of a simple sample and hold circuit is also shown (reference sign 1308 denoted with small crosses in FIG. 13B). The simple sample and hold circuit is a circuit with only one storage element.

In the example of FIG. 13B, sample 103 is detected to be a distorted sample. The detection might be done as above explained e.g. at hand of FIGS. 6A and 6B, i.e. based on signal quality and/or sample threshold, see FIG. 4). Although sample 102 is also irregular, it is not detected to be a distorted sample by the signal quality and/or sample threshold. This might be e.g. because the signal quality is still above threshold 401-1 in FIG. 4 and the sample still lies below the sample threshold 401-2.

Without any processing, distorted samples 102 and 103 will lead to a clearly audible noise in the audio output, e.g. a click noise.

When circuit 1200 shown in FIG. 12 is, however, used, the undesired noise effect can be drastically reduced as be seen in FIG. 13B.

In order to explain the functioning of circuit 1200 in FIG. 12, the input samples have been denoted with reference signs 97 to 110 and the corresponding output samples have been labeled with 97' to 107'. Thus, sample 97' corresponds to input sample 97 and so on.

As mentioned, sample 103 corresponds to a distorted sample. This is determined as explained above (FIGS. 4-6), e.g. based on the signal quality of the modulated audio signal and/or based on the demodulated samples. Sample 102, however, has not been determined to be a distorted sample, e.g. since the signal quality was still determined to be acceptable. Therefore, EN(n) for sample 102 was still enabled and only disabled for sample 103.

Therefore, sample 102 was still input as last sample before the distorted sample 103 into the series of storage elements of FIG. 12. It will, therefore, be output as sample 102'. However, sample 103, which has been determined to be a distorted sample is effectively blanked out since the circuit 1200 has the function to repeat "historic" sample 100 (output as sample 100'), as shown in FIG. 13B. In other words, when the distorted sample 103 was determined the previous sample 100 lying N number of samples before the distorted sample, N being a positive integer value and greater than 1, in this case N=3, was repeated. This in turn leads to sample 103 being replaced by the non-distorted sample preceding the distorted sample, i.e. sample 103 will be replaced by sample 102.

Figure 13C:
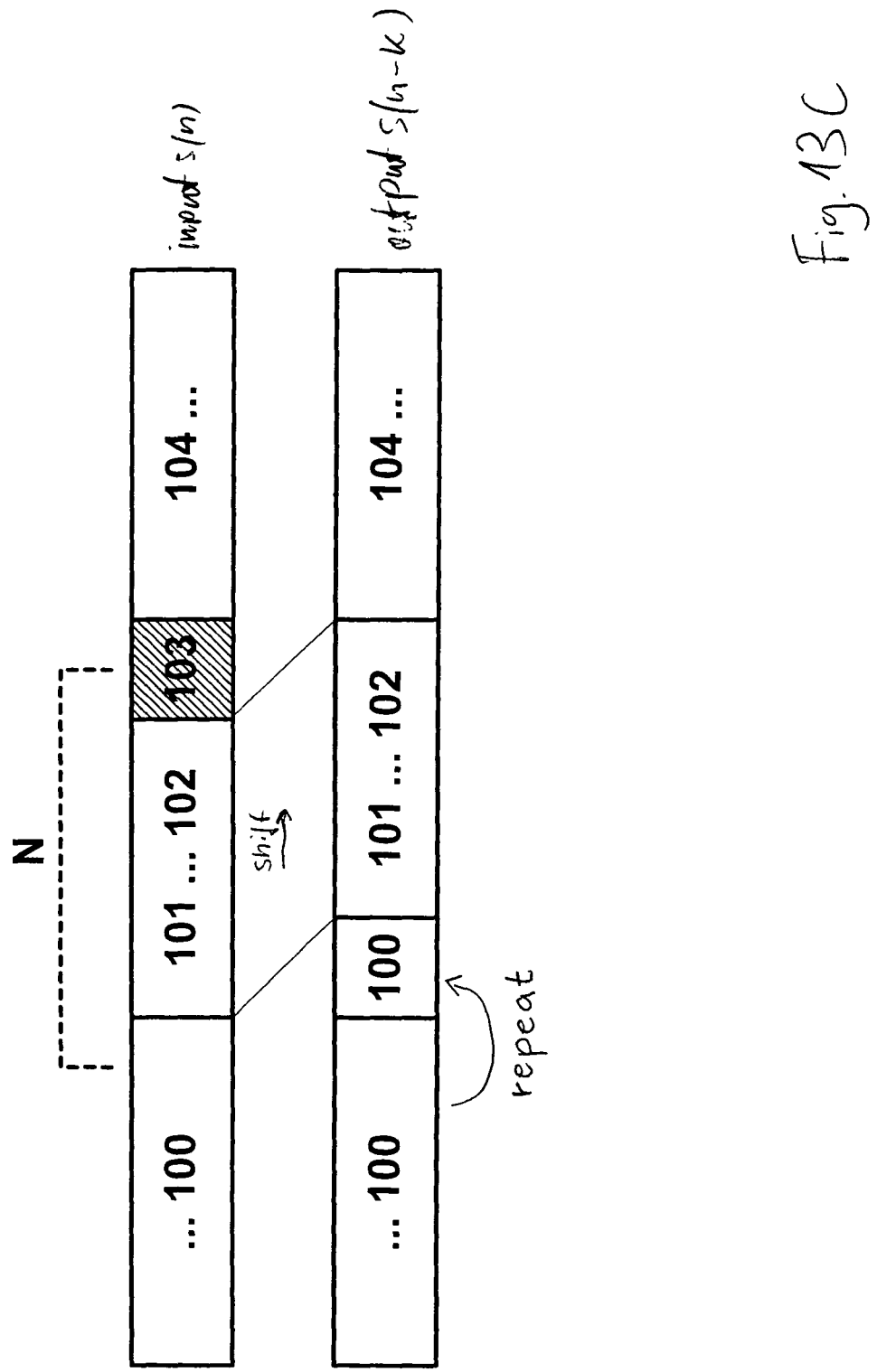

The repeating of a previous ("historic") sample and the replacement of a distorted sample with a preceding non-distorted sample is further illustrated in FIG. 13C. In FIG. 13C, samples lying below each other in the drawing plain correspond to input samples s(n) and output samples s(n-k) which are input into circuit 1200 at input 504 and output at output 504-$k$, respectively. As seen, sample 100 is repeated. This is when the distorted sample 103 is detected at the input 504 (cf. FIG. 13B). As soon as no more distorted samples are detected, the remaining samples between previous sample lying N number of samples before the distorted sample (sample 100 in upper part of FIG. 13C) and the distorted sample (sample 103), i.e. samples 101 . . . 102 are output directly following the last repeated sample (repeated sample 100, see lower part of FIG. 13C). This may also be seen as a "shift" of samples as indicated by the inclined lines in FIG. 13C illustrating how samples 101-102 are shifted. The shifting is thereby such that the distorted sample will be replaced by the last sample of the shifted samples. In the example of FIG. 13C, this is sample 102 that replaces the distorted sample 103. Thus, sample 103 is being replaced by the non-distorted sample preceding the distorted sample, i.e. sample 102.

The effect of repeating sample 100, i.e. a sample lying N number of samples before the distorted sample 103 may be an improvement of audio quality. A possible reason for this is that samples lying further away from a distorted sample are possibly less likely to be effected by the distortion.

For comparison, the output of circuit 1200 may be compared with the output 1308 of a simple sample and hold unit. A simple sample and hold unit would correspond to FIG. 12 with only one storage element 1202-1 (no series of storage elements).

As can be seen the result of a simple sample and hold unit as depicted by curve 1308 has a much higher energy than signal 1302 output by circuit 1200 with three delay units (three storage elements).

Due to the lower energy, the distortion is much less audible than when using a simple sample and hold unit. Also, further filtering may be more effective since the lower energy signal 1302 may be more easily filtered than the signal 1308 with the distortion having a high energy.

Figure 14:
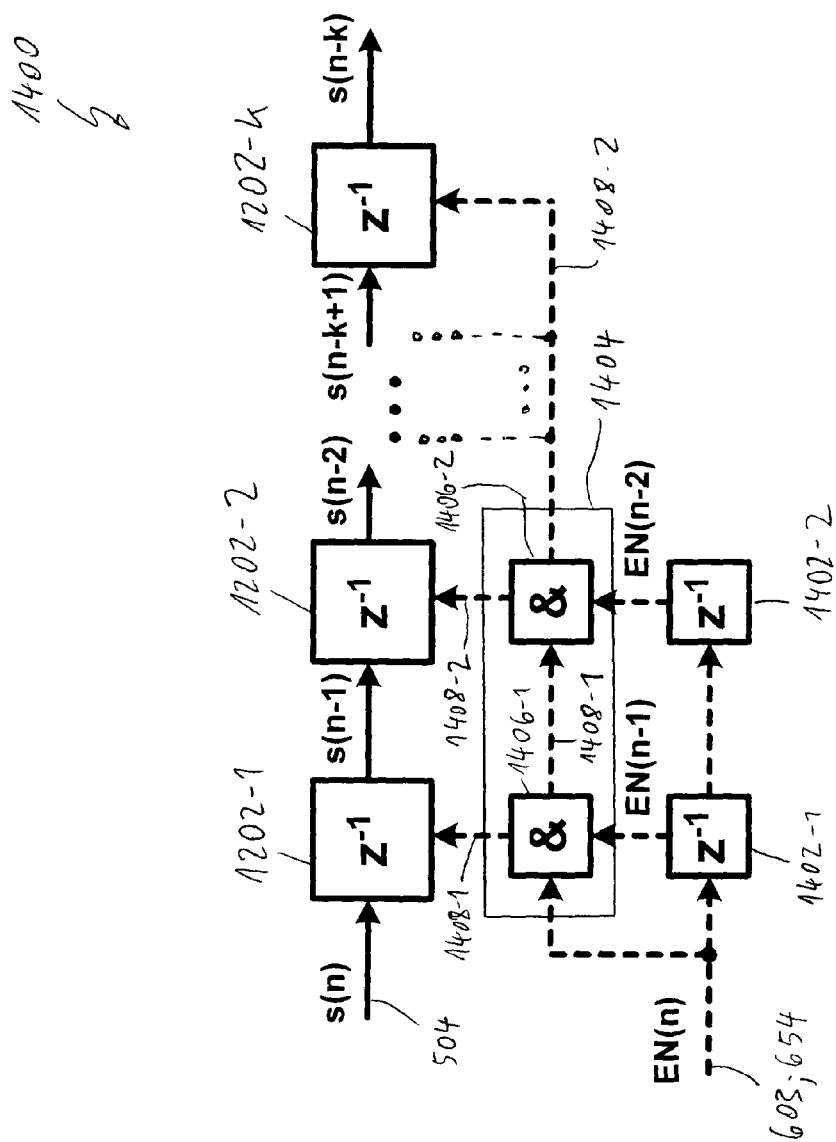
FIG. 14 shows a further embodiment of a concealment unit.

FIG. 14 shows a further embodiment of a circuit 1400 that may be used in a receiver. Circuit 1400 may e.g. be integrated in the concealment unit 604 shown in FIGS. 6A and 6B. Similar as to circuit 1200, the circuit 1400 may have the same input signals 504 and 603 and/or 504 and 654.

In addition to storage elements 1202-1, . . . , 1202-$k$, circuit 1400 comprises a further series of storage elements 1402-1, 1402-2. While in the embodiment of FIG. 14, only two such storage elements 1402 are shown, it is possible that further storage elements 1402 of this series are included. Storage elements 1402-1, 1402-2 may store and output a delayed enable signal. For example, storage element 1402-1 outputs a previous enable signal EN(n-1). Similarly, storage element 1402-2 outputs enable signal EN(n-2).

Circuit 1400 further comprises a control logic 1404, which controls the series of storage elements 1202-1, ..., 1202-k. The control logic 1404 may comprise a series of AND logic units 1406. The number of AND logic units 1406 may be equal to the number of storage elements 1402. In the embodiment shown in FIG. 14, there are, therefore, two AND logic units 1406-1, 1406-2. The first AND logic unit 1406-1 has as input the current enable signal EN(n) of a current sample s(n) and the previous enable signal EN(n-1) which has been stored in storage element 1402-1. The control logic further comprises the second AND logic unit 1406-2 which has as input the enable signal EN(n-2) stored in storage element 1402-2 and the output of the AND logic unit 1406-1. As seen, the output signal 1408-1 of AND logic unit 1406-1 is used to control storage element 1202-1. Further, the output signal 1408-2 of AND logic unit 1406-2 is used to control storage element 1202-2. This signal, i.e. output signal 1408-2 is also used to control all further subsequent storage elements 1202-3, ..., 1202-k.

Of course, it would also be possible to use more storage elements 1402 and consequently more AND logic units 1406 than in the embodiment of FIG. 14. In this case, a longer series of distorted samples may be dealt with more effectively.

Figure 15A:
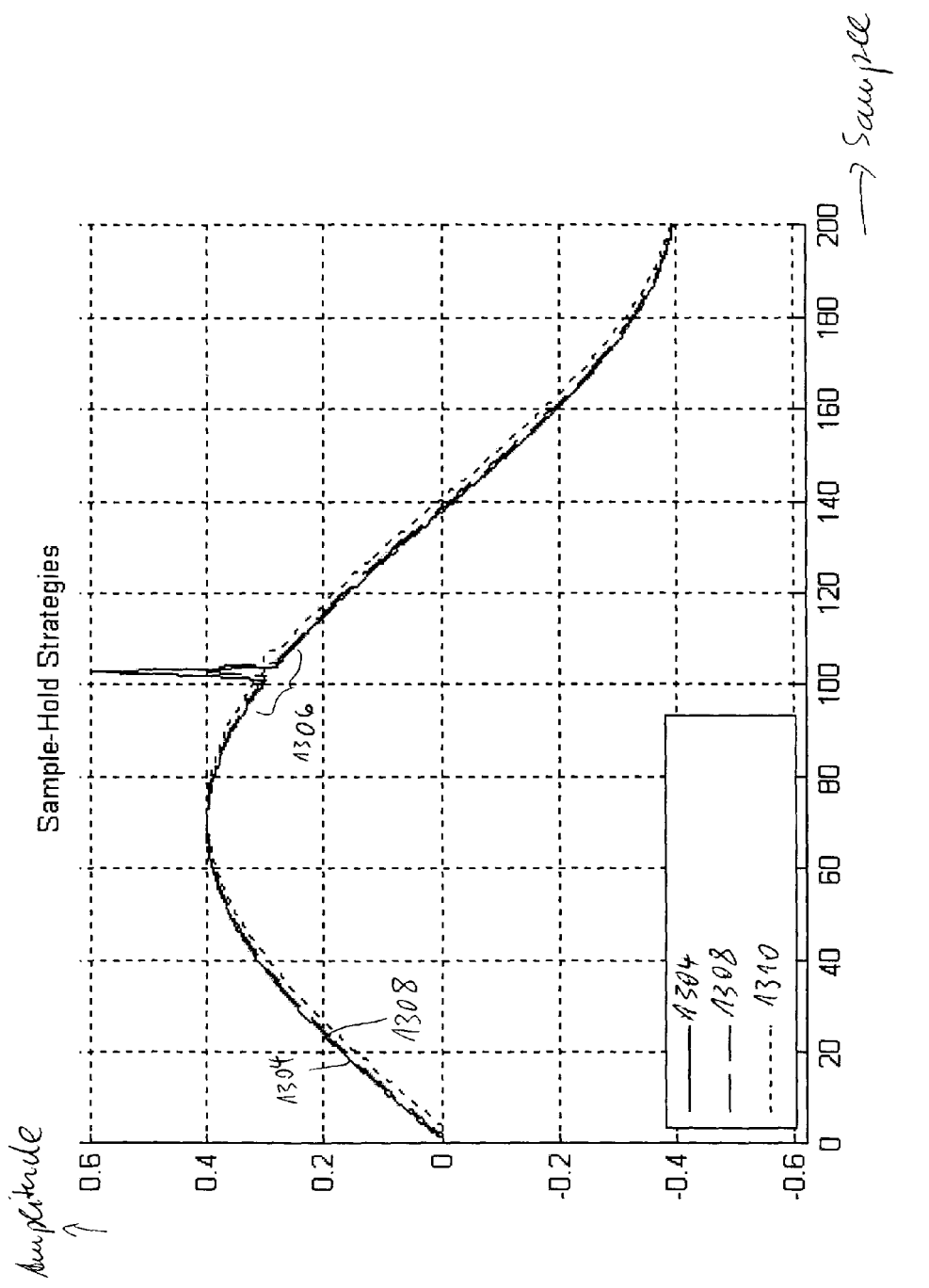
FIG. 15 shows results achieved with the embodiment of FIG. 14.
Figure 15C:
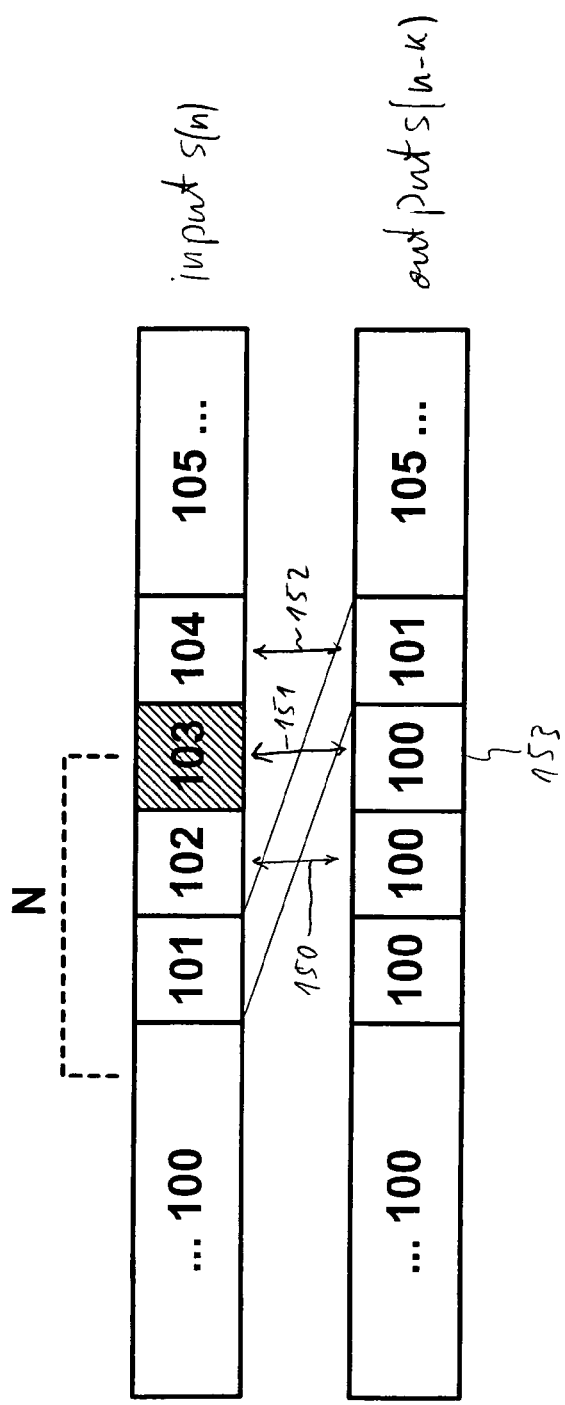

The functioning of circuit 1400 should be self-explanatory to those skilled in the art. Generally speaking, circuit 1400 has the effect that also samples around, e.g. before or after, a distorted sample will be "blanked out", i.e. the samples around (before and/or after) a distorted sample will not be output. Instead, a historical sample (previous sample), e.g. sample s(n-k) is repeated several times. This is shown in FIGS. 15A, 15B, and 15C, where the same reference signs are used as in FIGS. 13A, 13B, and 13C where appropriate. In FIGS. 15B and 15C, the same input signal 1304 is shown as in FIGS. 13B and 13B and also the same curve 1308 for comparison with a simple sample and hold circuit. The signal with reference sign 1310 depicted with small circles corresponds to the output of circuit 1400 of FIG. 14.

FIGS. 15B and 15C show that in case of a distortion, circuit 1400 has the function that a previous sample, in the example of FIG. 15B sample 100 is repeated several times, i.e. a predetermined number of times. In the example, sample 100' is repeated three times. The number of repetitions depends on the number of distorted samples and on how many samples before and/or after a distorted samples should be replaced, i.e. blanked out.

The circuit 1400 is designed such that one sample (sample 102) before a distorted sample (sample 103) and one sample (sample 104) following the distorted sample (sample 103) are replaced. This can be seen in FIG. 15C where sample 102 is replaced by sample 100 as indicated by arrow 150, sample 103 is replaced by sample 100 as indicated by arrow 151 and sample 104 is replaced by sample 101 as indicated by arrow 152. Thus, three samples are replaced. Therefore, also three "good" samples, i.e. samples that are further away from the distorted sample (=the sample lying N number of times before the distorted sample), are repeated. In other words, the number of repetitions of a previous sample corresponds to the number of replaced samples.

After the last repeated sample (reference sign 153 in FIG. 15C), samples (in FIG. 15C only one sample 101) lying between the previous sample lying N number of samples before the distorted sample and a sample (in FIG. 15C sample 102) lying a predetermined number of samples (in FIG. 15C one sample) before the distorted sample are output directly following the last repeated sample 153. In other words, sample 101 is shifted.

The effect of circuit 1400 is that a sample "far away from" (N number of samples before) a distorted sample, in the example sample 100, is repeated and samples lying around a sample detected to be a distorted sample (samples 102 and 104 lying around sample 103 determined to be a detected sample) are replaced. Therefore, samples around a distorted sample which may be assumed to be effected by the distortion as well are also replaced which may lead to significant better audio output.

Thus, it is possible to avoid the output of samples that have not been determined to be a distorted sample based on the signal quality which samples are, however, irregular as is sample 102 in the example.

Therefore, using the circuit 1400 in concealment unit 604 of FIGS. 6A and/or 6B leads to clearly less audible distortions when compared to a simple sample and hold unit (curve 1308 in FIG. 15B) or when compared to circuit 1200 (curve 1302 in FIG. 13B).

In the circuits 1200 and 1400 shown in FIGS. 12 and 14, respectively, the number of storage elements 1202 may be selected depending on expected distortions of a channel between a transmitter of the modulated analog audio signal and the receiver. For example, if burst distortions are expected, it might be reasonable to use a larger number of storage elements 1202. For example, three to eight storage elements might be used.

As is clear from the above, digital signal streams may contain distorted samples which have bad effect on the perceived signal quality. If distortions are very heavy (e.g. as in the case of burst distortions), it might be advantageous to replace the distorted samples by an estimation.

A simple and efficient estimation can be realized by applying a simple sample and hold unit, as described e.g. in connection with FIGS. 1 to 11. In this case, the last sample is repeated in order to replace a current one which is supposed to be distorted. Depending on the heaviness of the distortions, such a simple sample and hold unit might be sufficient for dealing with distortions. The advantage of a simple sample and hold unit is that it is very easy and requires only very few circuitry and few processing power.

FIGS. 12 and 14, however, show more sophisticated circuits. In these circuits, a number of storage elements, e.g. realized by flipflops $z^{-1}$ with enable input EN, are used and controlled with the same sample and hold control signal EN(n). This control signal may be derived from a signal quality detector as described above, delivering a "0" indicating a distorted signal (when used e.g. with enable flipflops) and a "1" indicating reliable signal samples.

The effect is that not the last sample is repeated but some sample in the signal's history s(n-k) while the rest of the signal "in between" is "shifted over" the distorted sample to replace this one.

A clear advantage is, thus, obtained in case of burst distortions. In such cases the adjacent samples of a detected distorted one may also be unreliable. Repeating such unreliable sample would give a bad impact on the signal as well. Repeating a sample which has some distance to the sample supposed to be distorted is, therefore, more reliable.

The invention claimed is:

1. A method of demodulation, comprising:
   determining samples of a modulated analogue audio signal;
   detecting at least one distorted sample of said samples depending on a signal quality of said modulated analogue audio signal; and
   replacing said distorted sample; wherein
   when the distorted sample is detected, a previous sample occurring N number of samples before the distorted sample, N being a positive integer value and greater than 1, is repeated and the distorted sample is replaced by the previous sample.

2. The method according to claim 1, wherein said samples are demodulated samples and said at least one distorted sample is determined by comparing a value of said demodulated samples with a sample threshold.

3. The method according to claim 2, wherein a sample is determined to be a distorted sample if said signal quality is below a signal quality threshold and said value lies above said sample threshold.

4. The method according to claim 1, comprising a step of generating at least one replacement sample based on an interpolation of a previous and following non-distorted sample, wherein said distorted sample is replaced by said replacement sample.

5. The method according to claim 4, wherein said interpolation depends on said signal quality.

6. The method of claim 1, wherein the previous sample is repeated as long as consecutive distorted samples occur.

7. The method of claim 1, wherein samples lying between the previous sample occurring N number of samples before the distorted sample and the distorted sample are output directly following the last repeated sample.

8. The method of claim 1, wherein the previous sample is repeated a predetermined number of additional times.

9. The method of claim 8, wherein the distorted sample and at least one sample lying before the distorted sample are replaced with non-distorted samples preceding the distorted sample.

10. The method of claim 8, wherein the distorted sample and at least one sample lying after the distorted sample are replaced with non-distorted samples preceding the distorted sample.

11. The method of claim 8, wherein samples lying between the previous sample occurring N number of samples before the distorted sample and a sample lying a predetermined number of samples before the distorted sample are output directly following the last repeated sample.

12. The method of claim 1, wherein N is selected depending on the type of expected channel distortions of the channel between a transmitter of the modulated analog audio signal and the receiver.

13. The method according to claim 1, wherein a sample is determined to be a distorted sample if said signal quality is below a signal quality threshold.

14. The method according to claim 1, wherein said modulated analogue audio signal is a frequency modulated analogue audio signal and said signal quality is determined based on a magnitude of said frequency modulated analogue audio signal.

15. The method according to claim 14, wherein if N distorted samples have been determined based on said signal quality, N+1 samples are replaced.

16. The method according to claim 1, wherein said modulated analogue audio signal is a phase modulated analogue audio signal and said signal quality is determined based on a magnitude of said phase modulated analogue audio signal.

17. The method according to claim 1, wherein said modulated analogue audio signal is an amplitude modulated audio signal and said signal quality is determined based on a phase of said amplitude modulated audio signal.

18. The method according to claim 1, wherein said samples are demodulated samples.

19. A receiver, comprising:
    a first signal processor adapted to determine samples of a modulated analogue audio signal, and further adapted to determine a signal quality of said modulated analogue audio signal;
    a second signal processor adapted to determine at least one distorted sample of said samples depending on said signal quality, and further adapted to replace said distorted sample; wherein
    said second signal processor comprises a series of N storage units adapted to store and output a time-shifted sequence of samples, with N being an integer value greater 1.

20. The receiver according to claim 19, wherein said samples are demodulated samples and said second signal processor is further adapted to compare a value of said demodulated samples with a sample threshold and to thereby determine said at least one distorted sample.

21. The receiver according to claim 19, wherein said second signal processor is further adapted to replace said distorted sample with a previous and/or following non-distorted sample.

22. The receiver according to claim 19, wherein said second signal processor is further adapted to generate at least one replacement sample based on an interpolation of a previous and following non-distorted sample, wherein said distorted sample is replaced by said replacement sample.

23. The receiver according to claim 19, wherein said modulated analogue audio signal is a frequency modulated analogue audio signal and said first signal processor is adapted to determine said signal quality based on a magnitude of said frequency modulated analogue audio signal.

24. The receiver according to claim 23, wherein said second signal processor comprises a sample and hold unit adapted to hold a non-distorted sample in order to replace said distorted sample and one following sample.

25. The receiver according to claim 19, wherein said second signal processor comprises a sample and hold unit adapted to hold a non-distorted sample in order to replace said distorted sample.

26. The receiver according to claim 19, wherein all of said N storage units are, at the same time, controlled by an enable signal which depends on said signal quality.

27. The receiver according to claim 19, wherein said N storage units are controlled by a time-shifted enable signal which depends on said signal quality.

28. The receiver according to claim 19, wherein N is selected depending on the type of expected channel distortions of the channel between a transmitter of the modulated analog audio signal and the receiver.

29. The receiver according to claim 19, wherein said modulated analogue audio signal is a phase modulated analogue audio signal and said signal quality is determined based on a magnitude of said phase modulated analogue audio signal.

30. The receiver according to claim 19, wherein said modulated analogue audio signal is an amplitude modulated audio signal and said signal quality is determined based on a phase of said amplitude modulated audio signal.

31. The receiver according to claim 30, comprising a phase locked loop adapted to determine said samples and said phase.

32. The receiver according to claim 19, comprising:
an enable signal generating means for determining an enable signal depending on said signal quality;
wherein the second signal processor is adapted for holding a previous sample if said enable signal is disabled.

\* \* \* \* \*